United States Patent [19]

Edwards et al.

[11] Patent Number: 5,006,246
[45] Date of Patent: Apr. 9, 1991

[54] BAFFLED PARTICULATE MATERIAL HOUSING

[75] Inventors: Evan A. Edwards, Pittsford; Peter J. Harissis, Rush; Krishna S. Menon, Liverpool, all of N.Y.

[73] Assignee: Eastman Kodak Company, Rochester, N.Y.

[21] Appl. No.: 452,924

[22] Filed: Dec. 19, 1989

[51] Int. Cl.⁵ .............................................. B01D 27/02
[52] U.S. Cl. ..................... 210/264; 210/282; 210/285
[58] Field of Search .............. 210/263, 264, 266, 282, 210/283, 285, 286

[56] References Cited

U.S. PATENT DOCUMENTS

| | | | |
|---|---|---|---|
| 746,292 | 12/1903 | Clark | 210/285 |
| 2,027,400 | 1/1936 | Pennebaker | 210/285 |
| 3,348,692 | 10/1967 | Balogh | 210/266 |
| 3,452,966 | 7/1969 | Smolski | 261/77 |
| 3,517,816 | 6/1970 | Hoppen | 210/266 |
| 3,695,173 | 10/1972 | Cox | 210/225 |
| 4,350,595 | 9/1982 | Gunkel | 210/656 |
| 4,637,881 | 1/1987 | Sciuto | 210/689 |

Primary Examiner—Robert A. Dawson
Assistant Examiner—Wanda L. Millard
Attorney, Agent, or Firm—John B. Turner

[57] ABSTRACT

A fluid treatment device is described which includes a cylindrical housing with fluid inlet and outlet means at or adjacent opposite ends. Particulate material for treating fluid flowed through the device, is disposed within the housing, between the inlet and outlet means. A helical baffle is disposed within the housing in the particulate material. The baffle extends axially along the housing and the free edges of its fins are in contact with the housing. The baffle serves to impose a helical path on fluid flowing through the device so that, when the device is mounted with its axis horizontal and with a volume of particulate material less than the volume of the space within the housing, fluid flows through the particulate material most of the time and not entirely along the void as would be the case if the baffle were not present.

9 Claims, 4 Drawing Sheets

BAFFLED PARTICULATE MATERIAL HOUSING

This invention relates to fluid treatment devices wherein fluid is passed through particulate material, within the device, for treatment thereby.

Fluid treatment devices are known which include a cylindrical housing containing particulate material. There are inlet means at or adjacent one end of the housing for the entry of fluid to be treated by the particulate material. There are outlet means at or adjacent the other end of the housing for the outlet of treated fluid. It is known that if such devices are installed in a horizontal disposition, that is, with the axis of the cylindrical form of the housing being horizontal, there is the problem that the particulate material may settle and create a void over the top of the particulate material and extending, perhaps, at worst, for the entire distance between the inlet and outlet means. If such a condition occurs, the fluid can travel between the inlet and outlet means along the void and not be in imposed and continuous contact with the particulate material during its temporary residence in, and passage through, the device. Such a condition obviously is very undesirable because the fluid does not get properly treated. Endeavors to overcome such problems have included making the space within which the particulate material is located, of variable volume so that the volume of the space can match the volume of the particulate material. Such endeavors have included making one of the ends of the space containing the particulate material, in the form of a piston spring-biased towards the other end of the space. Another proposal has been to make the cylindrical housing flexible and to cause it to be biassed towards its axis.

Such proposals for overcoming the problem are not always successful and/or desirable. It is an object of the present invention to overcome the above-described problem in known fluid treatment devices which contain particulate treatment material.

SUMMARY OF THE INVENTION

According to the present invention a substantially helical baffle is provided within the housing. The baffle extends at least part way between the inlet means and the outlet means and is in continuous contact with the internal surface of the housing along a line in the general form of a helix. With such a baffle, even if the above-described void should occur when the device is mounted horizontally, the fluid cannot travel all the way between the inlet means and the outlet means in the void. At some point, depending on the length of the baffle compared to the distance between the inlet and outlet means and on the pitch of the helix, the fluid is constrained by the baffle to flow downwards into the particulate material and along an approximately helical path submerged in the particulate material.

In a preferred embodiment, the baffle includes a spine extending generally along the axis of the cylindrical housing and fins extending along the spine and away from the spine into contact with the housing.

Advantageously, the baffle may include at least three fins with each fin being being resiliently deformable whereby its edge remote from the spine is in forced contact with the internal surface of the cylindrical housing.

In other advantageous embodiments, the spine is tubular. In such cases the fins may be straight in cross section. The tubular spine is formed of resiliently deformable material and is deformed by engagement of the fins with the housing whereby the fins are in forced contact with the housing.

The inlet and outlet means for flow of fluid into and out of the particulate material may each include a porous plug which is permeable to the fluid and impermeable to the particulate material. One of the plugs may be spring biassed towards the other of the plugs whereby the particulate material is subjected to a compressive force tending to avoid voids within the housing, free of particulate material. In such embodiments, the baffle should be shorter than the distance between the plugs to allow the spring biassed plug to approach the other.

The invention may be used in many different treatments of many different fluids. It has been found particularly beneficial in the treatment of water when the particulate material is activated carbon. However, amongst other uses may be mentioned drying of refrigerant fluid in refrigeration systems and in such embodiments the particulate material is beads of dessicant.

Embodiments of the present invention will now be described, by way of example, with reference to the accompanying drawings, in which:

DESCRIPTION OF PREFERRED EMBODIMENT

Figure 1:
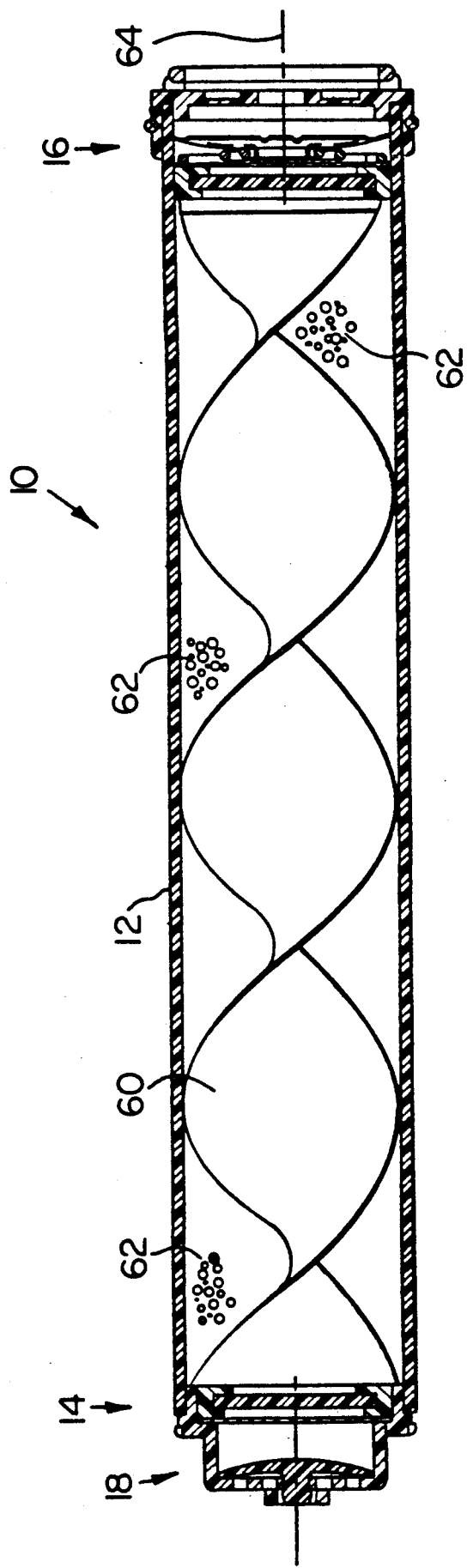
FIG. 1 is a view of an activated carbon filter for water, embodying the present invention, mainly in axial section but with the baffle not in section, and with only some of the particulate carbon shown, for the purpose of ease of understanding.

FIG. 1 illustrates a carbon filter 10 for use as the third filtering stage, termed the post filter, in a combined pre-filter, reverse osmosis membrane filter and post filter, such as is described in our copending U.S. patent application Ser. No. 208,817, filed June 16, 1988, still pending which is suitable for use in a domestic water purification system such as that described in our copending U.S. Pat. No. 4,909,934.

The filter 10 includes a housing 12 which is a cylindrical tube formed of plastics material. As seen in FIG. 1, the left end 14 of the filter 10 is the inlet end and the right end 16 is the outlet end of the filter.

Figure 2:
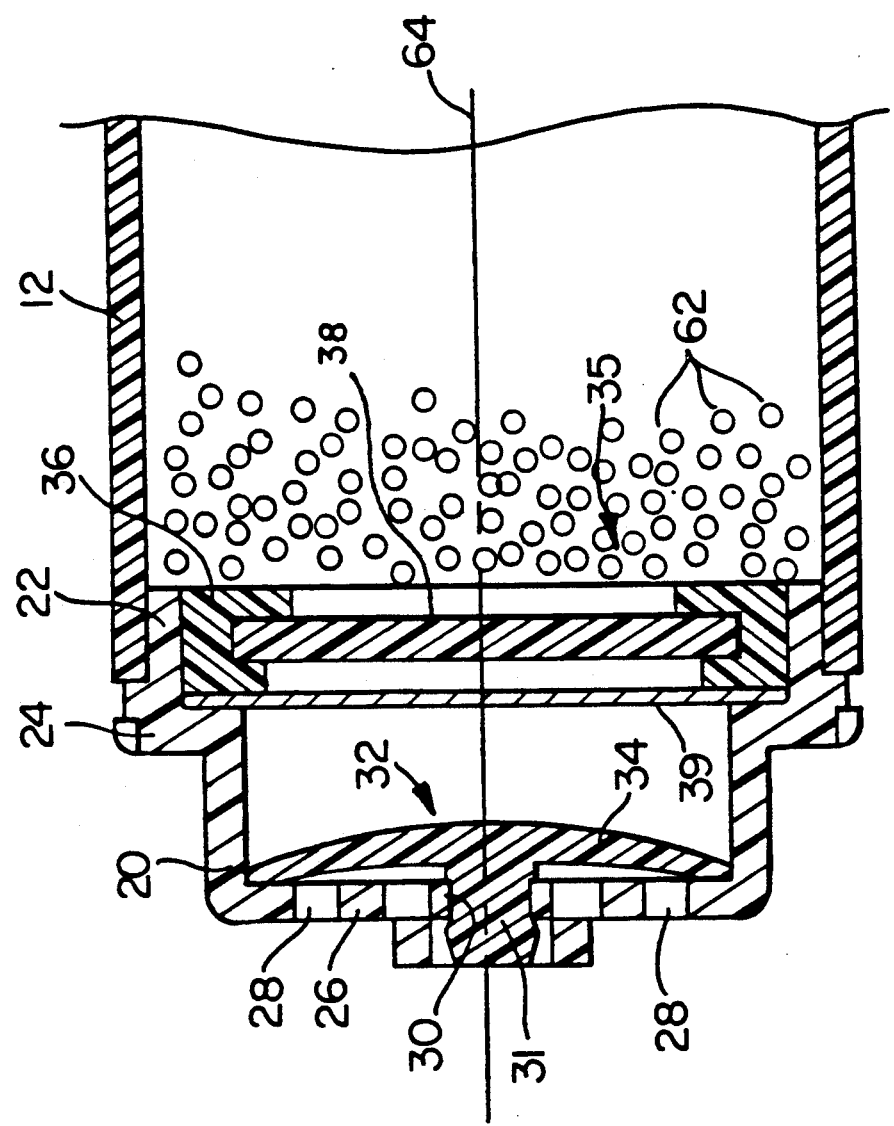
FIG. 2 is the left end portion of FIG. 1, on an enlarged scale.

The inlet end 14 of the housing 12 is closed by inlet means 18 which are illustrated on an enlarged scale in FIG. 2, to which reference is now directed. The inlet means 18 includes a cap member 20 which is generally cup-shaped and includes a cylindrical flange 22 which is so formed as to be a push fit within the tubular housing 12. The cap member 20 also includes an annular flange 24 which serves to limit the extent to which the cap member can be inserted into the housing 12. The bottom 26 of the cup shape of the cap member 20 has a plurality of apertures 28 for inflow of water into the filter. The bottom 26 has a central bore 30 in which is retained the retaining hub 31 of an umbrella valve 32. The umbrella valve 32 includes a disc 34 of readily flexible resilient material which is impermeable to water and which seats and seals against the inside of the bottom 26 of the cup-shape form of the cap member 20. The umbrella valve 32 acts as a check valve preventing water which has entered the filter, flowing back out of the filter through the inlet. Fixedly and sealingly secured within the cylindrical flange 22 of the cap member 20 is a plug 35 comprising a collar 36 which serves as a retainer for a disc 38 of ceramic fibrous material which is permeable to water and impermeable to the particulate carbon which is yet to be described. The disc 38 is sealed to the collar 36 at its periphery. The cylindrical flange 22 is sealed to the housing 12. Thus, the only path for water between the exterior of the filter at the left end and the interior of the housing 12 is an inflow path, and it is through the apertures 28 and the water-permeable disc 38. Trapped between the collar 36 and a facing annular shoulder on the inside of the cap member 20, is a disc 39 of perforated stainless steel sheet which serves to prevent any untoward gross outward deformation of the fibrous disc 38.

Figure 3:
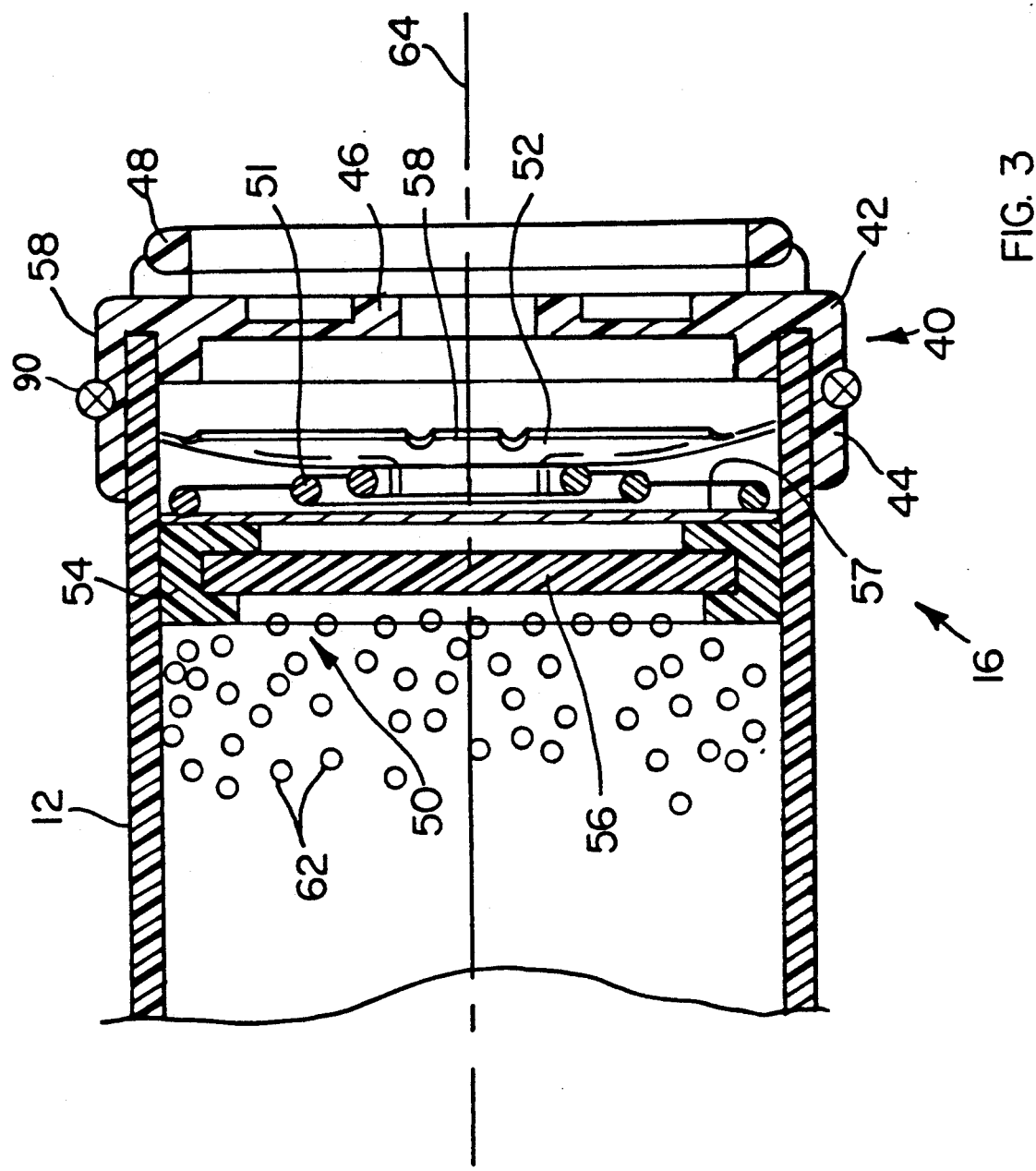
FIG. 3 is the right end portion of FIG. 2, on an enlarged scale.

Reference is now made to FIG. 3 of the accompanying drawings. The outlet end 16 of the housing 12 is closed by outlet means 40. The outlet means 40 include a cup-shaped member 42 having a cylindrical side wall 44 and a perforate bottom 46. The side wall 44 fits around the outside of the housing 12 and is secured thereto by adhesive, solvent welding or the like. Integral with the outside of the bottom 46 of the cup shape of the member 42 is a ring pull 48 which is a ring secured at at least one point to the bottom 46. The ring is deformable and may be engaged by a finger for pulling axially of the filter device 10 to remove it from an operative position.

Within the outlet end 16 of the housing 12 is an axially slidable plug 50 which is biassed leftwards, as seen in FIG. 3, i.e. towards the other end of the housing 12, by spring means, which, in the present embodiment, is in the form of a conical spiral spring 51 which reacts against a retaining device 52. The plug 50 includes an annular collar 54 which has a cylindrical outer surface which is a sliding fit within the housing 12. The radially inner surface of the collar 54 has an undercut in which is received the periphery of a disc 56 which is formed of ceramic fibrous material which is permeable to water and impermeable to the carbon particles which are yet to be described. The periphery of the disc 56 is sealed to the collar 54.

A disc 57 of perforated stainless steel is disposed between the collar 54 and the spring 51. It is stiff and serves not only to spread the force of the spring 51 but also to prevent any gross outward distortion of the fibrous disc 56. The spring 51 bears against both the disc 57 and the retaining device 52. The retaining device is dished, being convex towards the spring, and has tangs 58 which engage the housing 12 and prevent rightwards movement of the retaining device relative to the housing 12.

Referring again to FIG. 1, within the housing 12 between the inlet means 18 and the outlet means 40 there is a baffle 60 which is helical. In this embodiment of the present invention, the baffle 60 is an extrusion of plastics material, specifically, polyethylene. The baffle was made by extruding a tape having a width slightly greater than the diameter of the housing, and twisting the extrudant before it sets. In this way, the edges of the baffle follow perfect helices and the baffle as a whole has a screw like form. By making the width of the baffle slightly greater than the diameter of the housing the baffle has to be slightly flexed in order to insert it in the housing and this ensures that the edges of the baffle are a good sealing fit with the housing. Also, even if there are some departures from the true cylindrical form of the internal surface of the housing, the baffle can accommodate such imperfections and still seal to the housing. The baffle is slightly shorter than the distance between that end of the cylindrical flange 22 of the cap member 20 of the inlet means 18 which faces the outlet means 40, and that end of the collar 54 of the outlet means 40 which faces the inlet means 18, when the spring means 51 is in a relaxed condition.

Filling the housing between the disc 38 and the disc 56 there is particulate activated carbon 62 only some of which is represented in FIGS. 1, 2 and 3. The volume of the carbon and the positioning of the retaining device 52 are such that the spring means 51 is compressed and hence tends to prevent voids free of carbon. However, the baffle is the primary means of ensuring that water flowing through the filter from the inlet end 14 to the outlet end 16 is caused to flow in contact with carbon. Absent the baffle 60, and absent the spring means 51, and with a volume of carbon particles 62 less than the volume of the space within the housing between the discs 38 and 56, and with the filter 10 in a horizontal disposition, i.e. with the axis 64 of the cylindrical form of the housing 12 horizontal, a carbon particle free void could form above the carbon particles all the way between the inlet end 14 and the outlet end 16. If such a void developed, water could pass through the filter without any contact with, and treatment by, the carbon. Analysis has shown that if a situation should arise in which 95% of the cross-sectional area of the housing 12 were to be filled with particulate carbon, i.e. 5% of the cross-sectional area were to be void, throughout the length of the filter, then with a baffle in accordance with the present invention and having two full turns, as shown in FIG. 1, the path between the inlet means 18 and the outlet means 40 would be in the void for only 5% of the path length. It will be recognized by those skilled in the art that when a filter such as that specifically described above is used in a reverse osmosis domestic water purification system, the flow rate through the filter is so low that the flow could be accommodated by the void without any tendency for it to be through also the carbon particles. Thus, the entire flow could easily pass through the void without any imposed contact with the carbon and would leave the water untreated.

Figure 4:
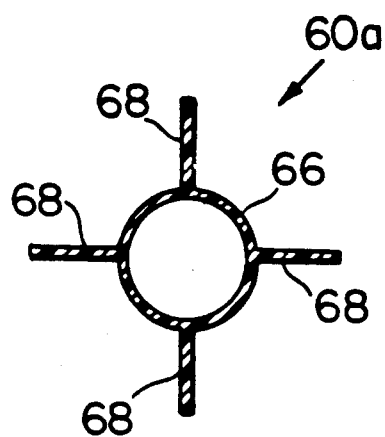
FIG. 4 is a cross-section of an alternative baffle usable in the device illustrated in FIG. 1, in an undeformed state.

FIG. 4 is a cross-section of an alternative form of baffle 60a in an unstressed form, as extruded. The baffle 60a includes a spine 66 and four fins 68. The diameter of the baffle, that is, the distance between the free edges of opposed fins 68, is slightly greater than the inside diameter of the housing 12. The baffle 60a is compressed radially for insertion into the housing 12 and is slid axially into the housing. The material of the baffle is resilient so that it tends to resume its uncompressed state and, in so doing, bears against the inside surface of the housing 12.

Figure 5:
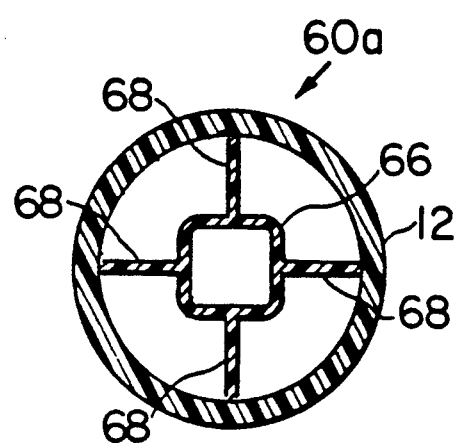
FIG. 5 is a cross-section of the baffle illustrated in FIG. 4, but in a deformed state and disposed within the housing of the device illustrated in FIG. 1.

FIG. 5 shows the baffle 60a with the spine still in a slightly deformed state and with the fins bearing against the inside surface of the housing 12.

Figure 6:
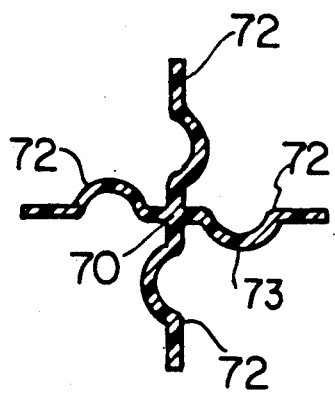
FIG. 6 is similar to FIG. 4 but shows a second alternative form of baffle.

FIG. 6 shows a second alternative form of baffle 60b in an unstressed state, as extruded. The baffle 60b includes a spine 70 and four fins 72. The diameter of the baffle, that is, the distance between the free edges of opposed fins 72, is slightly greater than the inside diameter of the housing 12. In this form of the baffle, the fins have a serpentine form, seen at 73, so that they may be readily compressed. The baffle 60b is compressed radially for insertion into the housing 12 and is slid axially into the housing. The material of the baffle is resilient so that it tends to resume its uncompressed state and, in so doing, bears against the inside surface of the housing 12.

Figure 7:
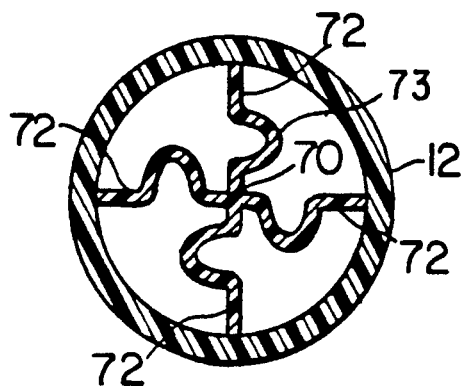
FIG. 7 is similar to FIG. 5 but shows the second alternative form of baffle in the deformed condition and within the housing.

FIG. 7 shows the baffle 60b with the fins still in a slightly deformed state and with the fins bearing against the inside surface of the housing 12.

Figure 8:
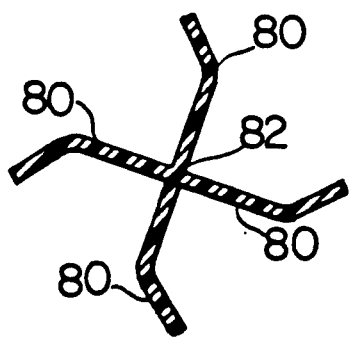
FIG. 8 is similar to FIGS. 4 and 6 but shows a third alternative form of baffle.
Figure 9:
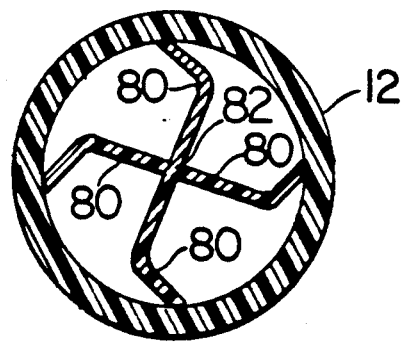
FIG. 9 is similar to FIGS. 5 and 7 but shows the third alternative form of baffle in the deformed condition within the housing.

FIG. 8 shows an alternative form of baffle 60c which is similar to the baffle 60b in that the force causing the fins to bear against the housing 12 is derived from the resilience of the fins and the fact that they are deformed upon assembly. The baffle 60c includes four fins 80 radiating from a spine 82. Each fin 80 is shaped somewhat like a dog leg in that it is angular as shown at 84. This bent form, and the fact that the baffle is formed of resiliently deformable plastics material, causes the fins to bear against the housing 12 after having been deformed for assembly in the housing as shown in FIG. 9.

The fact that the fins 68, 72 and 80 bear against the housing ensures that a good seal exists between the edges of the fins and the housing and also that any deformity of the internal surface of the housing 12 is accommodated without loss of the seal.

It is to be understood that FIGS. 4 to 9 show cross-sections and not cross-sectional views. Thus, the helical form of the baffles is not apparent. However, the fins and their edges are helical.

While four forms of baffle have been described, other forms may be adopted. It may be found desirable to have more than the two fins, which, in essence, the baffle described with reference to and illustrated in FIG. 1 has. If this is found to be the case, a baffle having three or more fins may be used.

The device 12 includes an O-ring seal 90 for sealing engagement with a housing in which the device is disposed in use. The seal serves to prevent water which is intended to flow through the device 12, but which has not, from mixing with water which has been treated in the device 12. In other words, the seal 90 prevents water bypassing the device.

The materials of some components have been mentioned. It is, of course, to be understood that if the filter device is to be used for drinking water purification, the materials should be selected to conform with all appropriate codes and standards.

While an embodiment of the invention has been described which is appropriate for treating water, it is to be understood that liquids other than water and fluids other than liquids, i.e. gases, may be treated in devices according to the present invention.

The invention has been described in detail with particular reference to preferred embodiments thereof, but it will be understood that variations and modifications can be effected within the spirit and scope of the invention.

What is claimed is:

1. A fluid treatment device including:
   a cylindrical housing having first and second ends;
   particulate material for treating said fluid, said particulate material being disposed within said housing;
   inlet means for flow of fluid into the particulate material at or adjacent one end of said housing;
   outlet means for flow of fluid out of the particulate material at or adjacent the other end of the housing; and
   a helical baffle within said housing, said baffle extending at least part way between said inlet means and said outlet means and including a spine extending generally along the axis of said cylindrical housing and fins extending along the spine and away from the spine into continuous contact with the internal surface of the housing along helices.

2. A fluid treatment device as claimed in claim 1, wherein there are at least three fins and each fin is resiliently deformable whereby its edge remote from the spine is in forced contact with the internal surface of the cylindrical housing.

3. A fluid treatment device as claimed in claim 1, wherein said spine is tubular.

4. A fluid treatment device as claimed in claim 3, wherein the fins are straight in cross-section and the tubular spine is formed of resilient material and is deformed by engagement of the fins with the housing whereby the fins are in forced engagement with the housing.

5. A fluid treatment device as claimed in any one of claims 1 to 4, wherein each of said inlet means and said outlet means includes a porous plug which is permeable to the fluid and is impermeable to the particulate material, one of said plugs being spring biassed towards the other of the plugs whereby the particulate material is subjected to compressive force and voids free of particulate material, within the housing, are avoided.

6. A fluid treatment device as claimed in claim 5, wherein said inlet means or outlet means including a spring biassed plug further includes a spring and a dished retaining device having tangs engaging the cylindrical housing, the retaining device being disposed at the side of the plug remote from the particulate material and being convex towards the plug, the spring being disposed between the retaining device and the plug and bearing on both the retaining device and the plug.

7. A fluid treatment device as claimed in any one of claims 1 to 4, wherein said inlet means includes a porous plug which is permeable to the fluid and is impermeable to the particulate material.

8. A fluid treatment device as claimed in any one of claims 1 to 4, wherein said outlet means includes a porous plug which is permeable to the fluid and is impermeable to the particulate material.

9. A fluid filter including a fluid treatment device as claimed in any one of claims 1 to 4, wherein said particulate material is activated carbon.

* * * * *